United States Patent
Nondahl et al.

(10) Patent No.: US 6,504,275 B2
(45) Date of Patent: Jan. 7, 2003

(54) ELECTRIC MOTOR HAVING ROTOR-EMBEDDED SENSOR

(75) Inventors: Thomas A. Nondahl, Wauwatosa, WI (US); Perry A. Delvecchio, Mentor, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/789,246

(22) Filed: Feb. 20, 2001

(65) Prior Publication Data

US 2001/0008352 A1 Jul. 19, 2001

Related U.S. Application Data

(63) Continuation of application No. 09/201,753, filed on Nov. 30, 1998, now Pat. No. 6,218,749.

(51) Int. Cl.$^7$ ................................................ H02K 11/00
(52) U.S. Cl. ................ 310/68 B; 310/68 C; 310/68 R; 310/261
(58) Field of Search ............................. 310/68 C, 68 B, 310/68 R, 72, 166, 261

(56) References Cited

U.S. PATENT DOCUMENTS

| | | | | |
|---|---|---|---|---|
| 3,329,869 A | * | 7/1967 | Obenhaus | ................. 310/68 C |
| 3,358,208 A | * | 12/1967 | Takami | ..................... 310/68 C |
| 3,404,313 A | * | 10/1968 | Happet et al. | ............ 310/68 C |
| 4,041,541 A | * | 8/1977 | Frossard et al. | .............. 361/27 |
| 4,230,961 A | * | 10/1980 | Calfo et al. | ............... 310/68 R |
| 4,379,291 A | * | 4/1983 | Hubbard et al. | ............ 340/682 |
| 4,629,948 A | * | 12/1986 | Tassinario | .................... 318/254 |
| 5,003,208 A | * | 3/1991 | Hama et al. | ............... 310/68 C |
| 5,571,568 A | * | 11/1996 | Ribi et al. | ................... 427/487 |
| 5,998,894 A | * | 12/1999 | Raad | ........................ 310/68 B |
| 6,005,310 A | * | 12/1999 | Mosciatti et al. | ............. 310/12 |

* cited by examiner

*Primary Examiner*—Burton S. Mullins
(74) *Attorney, Agent, or Firm*—Patrick S. Yoder; Alexander M. Gerasimow; William R. Walbrun

(57) ABSTRACT

An electromechanical device comprises a stator and a rotor which is capable of rotating relative to the stator. The rotor has a sensor embedded therein. In a preferred embodiment, the sensor is disposed within a plurality of laminations that are stacked one on top of another. For example, one of the plurality of laminations may be a sensor lamination, in which case the sensor is at least partially disposed within a cavity formed in the sensor lamination. Advantageously, the sensor may be used to directly measure rotor-associated operating conditions, such as rotor current (including the magnitude, frequency and phase of the rotor current), rotor fatigue, rotor temperature, rotor airgap, rotor flux and rotor torque. The sensor is especially well-suited for measuring current in the rotor of an induction motor.

59 Claims, 6 Drawing Sheets

ELECTRIC MOTOR HAVING ROTOR-EMBEDDED SENSOR

This is a continuation of U.S. application No. 09/201,753, filed Nov. 30, 1998, now U.S. Pat. No. 6,218,749.

BACKGROUND OF THE INVENTION

1. Field of the Invention

The present invention relates to electric motors and, in particular, relates to an electric motor having a rotor-embedded sensor. In a particularly preferred embodiment, the present invention relates to an induction motor having a rotor-embedded sensor that measures the current through one or more rotor windings.

2. Description of Related Art

Electric motors comprise a stator and a rotor that is capable of rotain relative to the stator. For precise motor control, it is generaly desirable to know as much as possible regarding motor operating conditions, including conditions that are parameters which can be measured and assigned a value. Consequently, a wide variety of sensors have been provided that are usefuil for sensing motor operating conditions. For example, position and velocity tranducers have been provided that can be mounted to an output shaft of a motor so that the angular position and/or angular velocity of the motor may be measured. As well, current sensors have been provided that can be coupled to the stator windings so that the current flowing the stator windings may be measured.

However, few if any sensors have been provided that are capable of directly measuring conditions associated with the rotor. For example, no known sensor has been provided that is capable of measuring current in the rotor windings of an induction motor. In an induction motor, current is induced in the rotor windings magnetically and, as a result, there are no electrical connections between the rotor windings and the remainder of the motor that can serve as the basis for performing such measurements. Thus, the rotor current cannot be directly measured using existing approaches.

Nevertheless, the ability to perform such measurements would be extremely useful. The magnitude of the current in the rotor windings of an induction motor is indicative of the torque produced by the motor shaft. Additionally, the frequency of the current in the rotor windings is the slip frequency, which can be used to determine the speed of the motor shaft. Finally, knowledge of the phase of the rotor current could be used to synchronize the phase of the current that is applied to the stator windings with the angular position of the rotor. Thus, the ability to measure rotor current would be extremely useful because it would enhance the ability to precisely control the induction motor.

Beyond motor control, the ability to measure rotor current would also be extremely useful for other reasons. For example, the rotor windings of an induction motor are generally formed of solid metal bars that are subject to fatigue and breaking. Currently, broken rotor bars are diagnosed by the acoustical noise and/or the excessive heat that is generated when a rotor bar breaks. However, it is often not possible to diagnose breaking in this way until several rotor bars windings are affected, by which time the motor must be replaced immediately. Therefore, it would be extremely useful to be able to measure the rotor current as a way of detecting broken rotor bars.

Other parameters that are useful to measure include rotor temperature, rotor airgap, rotor flux and rotor torque. Measuring these parameters is useful not only in conjunction with induction motors, but also in conjunction with all types of motors.

Accordingly, what is needed is a way to measure these and other rotor-associated operating conditions.

BRIEF SUMMARY OF THE INVENTION

The present invention provides a way to measure rotor-associated operating conditions, such as rotor current (including the magnitude, frequency and phase of the current), rotor fatigue, rotor temperature, rotor airgap, rotor flux and rotor torque. In general, the present invention may be used with all types of electromechanical devices including both electric motors and electric generators. In an especially preferred embodiment, the present invention provides a way to measure the rotor current in an induction motor.

According to one aspect of the invention, the present invention provides an electromechanical device that comprises a stator and a rotor which is capable of rotating relative to the stator. The rotor has a sensor embedded therein. In a preferred embodiment, the sensor is disposed within a plurality of laminations that are stacked one on top of another. For example, one of the plurality of laminations may be a sensor lamination, in which case the sensor is at least partially disposed within a cavity formed in the sensor lamination.

According to a preferred aspect of the invention, the sensor is a current sensor. For example, the current sensor may comprise a current transformer having a primary winding that is partially formed by a rotor bar that forms part of a rotor winding. Alternatively, a current sensor may be used that has a magnetic core which substantially encircles one of the rotor bars and a Hall effect device which is interposed between first and second adjacent ends of the magnetic core. The current measurement (magnitude, frequency, and/or phase) that is thereby obtained may then be used as a basis for controlling the motor. Alternatively, the sensor may also comprise a plurality of current sensors, each which measures current through a respective rotor bar. In this case, the sensor could be used to sense rotor bar fatigue.

According to another aspect of the invention, the present invention provides a method comprising providing an electric motor having a stator and a rotor that rotates relative to the stator, and sensing a motor operating condition using a sensor. The rotor includes the sensor that is used to sense the motor operating condition. Accordingly, the method also comprises the steps of transmitting information pertaining to the motor operating condition from the rotor to a motor control system. The motor control system is used to control the motor at least partially based on the information pertaining to the motor operating condition. Preferably, during the sensing step, the sensor senses current flowing through a rotor bar that partially forms a rotor winding of the rotor. In this case, the motor control system controls the motor based at least partially on the current measurement that is provided by the current sensor.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1A:
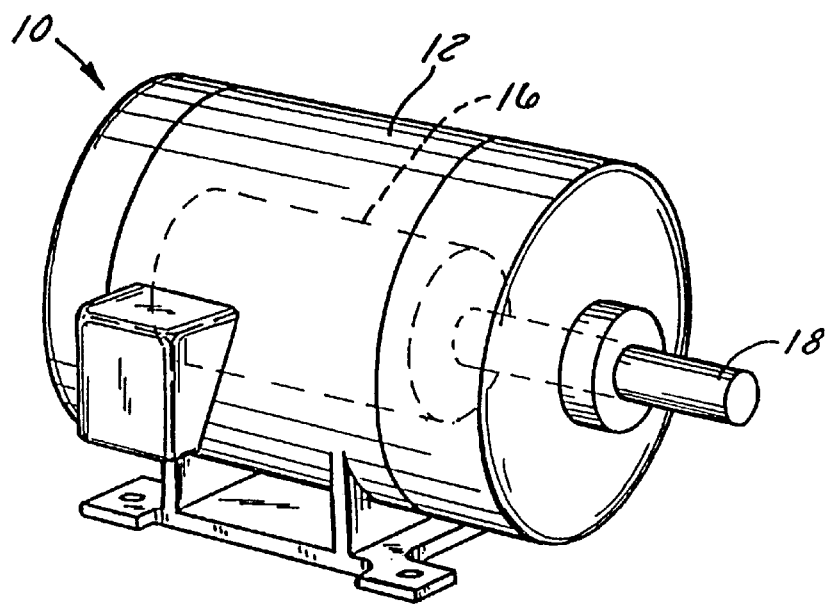
FIG. 1A is a perspective view of a motor having a rotor-embedded sensor in accordance with an embodiment of the present invention.
Figure 1B:
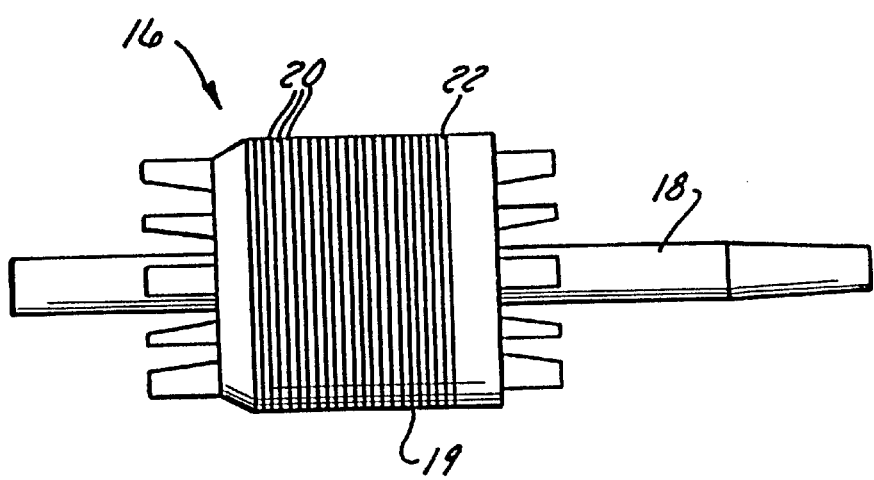
FIG. 1B is a side view of a rotor used in the motor illustrated in FIG. 1A.

Referring now to FIGS. 1A–1B, an electric motor 10 in accordance with an embodiment of the present invention is illustrated. The motor 10 comprises a stator 12 and a rotor 16 including a shaft 18. The rotor 16 and the shaft 18 are capable of rotating relative to the stator 12. As described in greater detail below, the rotor 16 comprises a rotor core 19 that is constructed using a plurality of laminations 20 including a sensor lamination 22.

Figure 2:
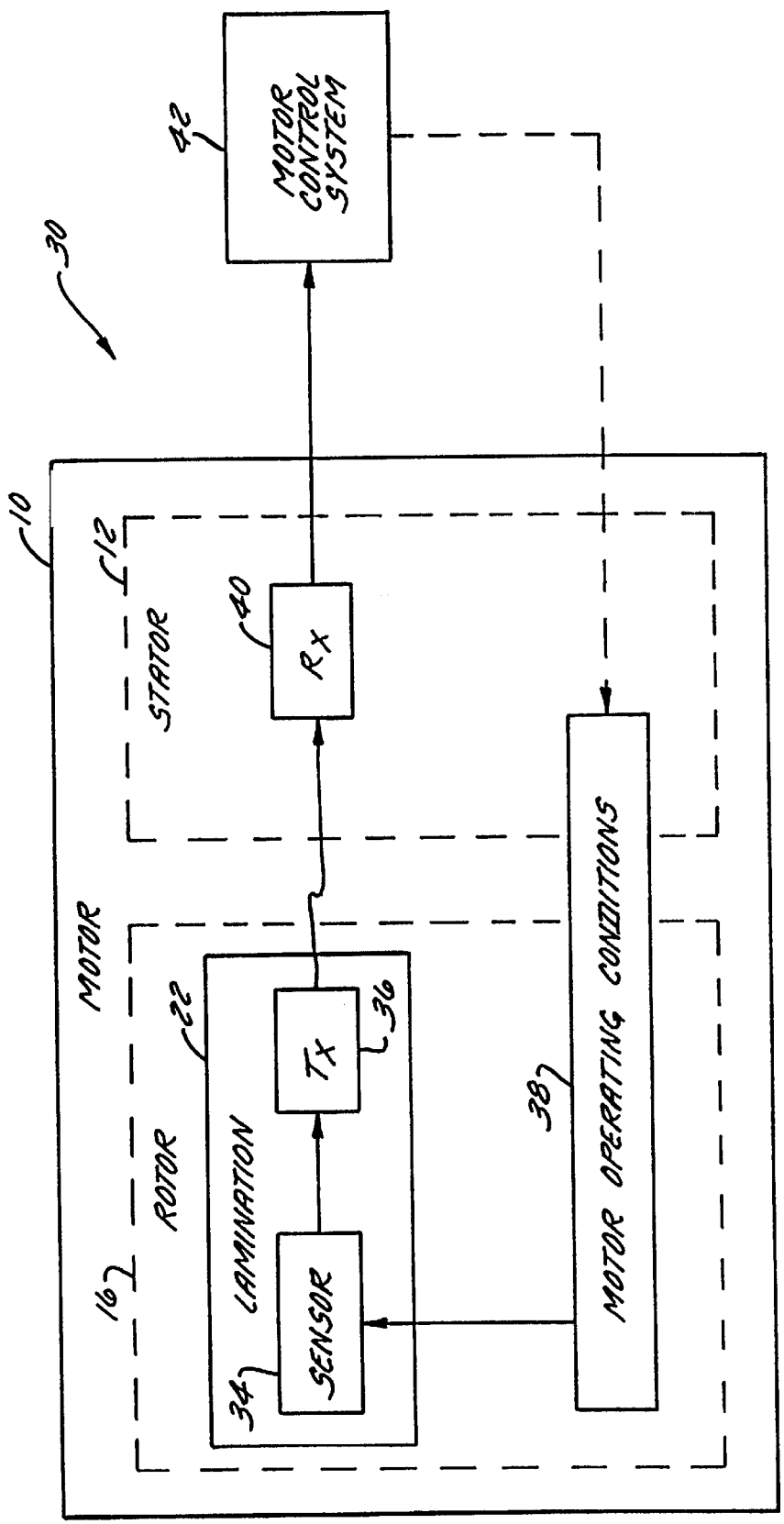
FIG. 2 is a block diagram of a motor system that includes the motor illustrated in FIG. 1A.

Referring now also to FIG. 2, a block diagram of a motor system 30 is illustrated that includes the motor 10 of FIG. 1. As shown therein, the sensor lamination 22 includes a sensor 34 and a transmitter 36. The sensor 34 senses one or more motor operating conditions 38. Using the transmitter 36, the sensor 34 transmits information pertaining to the motor operating conditions 38 to a receiver 40 disposed on the stator 12.

The transmitter 36 and the receiver 40 preferably establish either an optical communication link or a radio frequency (RF) communication link. In particular, if an optical communication link is established, then the transmitter 36 preferably comprises a light emitting diode that produces light having an intensity which is proportional to the voltage applied to the light emitting diode, and the receiver preferably comprises an array of photodetectors that are disposed around the perimeter of the stator adjacent the path of the rotating light emitting diode. If an RF communication link is established, then the transmitter comprises an RF transmitter and the receiver comprises an RF receiver. In either case, however, a current transformer is preferably used to power the transmitter 36 using the current flowing in one of the rotor windings as a power supply so that a separate power supply is not required.

The path of the transmitter 36 during rotation of the rotor 16 is preferably in close proximity to the receiver 40. This may be achieved by providing the lamination 22 as an end lamination disposed at an extreme end of the stack of laminations 20 and 22, and by mounting the receiver 40 in an end bell of the stator 12. This arrangement also facilitates placement of the sensor 34 within the rotor core 19, as described below.

The receiver 40 is coupled to a motor control system 42. The motor control system 42 implements closed-loop feedback control and includes a current control loop which controls the current applied to the stator windings of the stator 12, or a voltage control loop which controls the voltage applied to the stator windings. The motor control system 42 may also include one or more additional feedback control loops such as a torque control loop, a velocity control loop and/or a position control loop. Alternatively, an open-loop control system may be used.

Depending on the condition that is sensed, the motor control system 42 may utilize the information to control the motor 10 or may instead simply communicate the information to an operator of the motor system 30. For example, if the sensor 34 is a current sensor that measures rotor winding current to provide an indication of torque and/or shaft velocity, then this information may be used as torque or velocity feedback by the control system 42 to adjust the motor operating conditions. If, on the other hand, the sensor 34 is a rotor bar fatigue sensor, then the motor control system 42 communicates the information to an operator of the motor system 30, for example, so that the operator may choose to shut down the motor system 30 and repair or replace the motor 10 when multiple rotor bars have broken.

Referring now also to FIGS. 3–9, a number of different specific embodiments (22a, 22b, 22c, 22d and 22e) of the sensor lamination 22 are illustrated. The different laminations 22a, 22b, 22c, 22d and 22e each have a different respective specific embodiment (34a, 34b, 34c, 34d and 34e) of the sensor 34 embedded therein.

Figure 3:
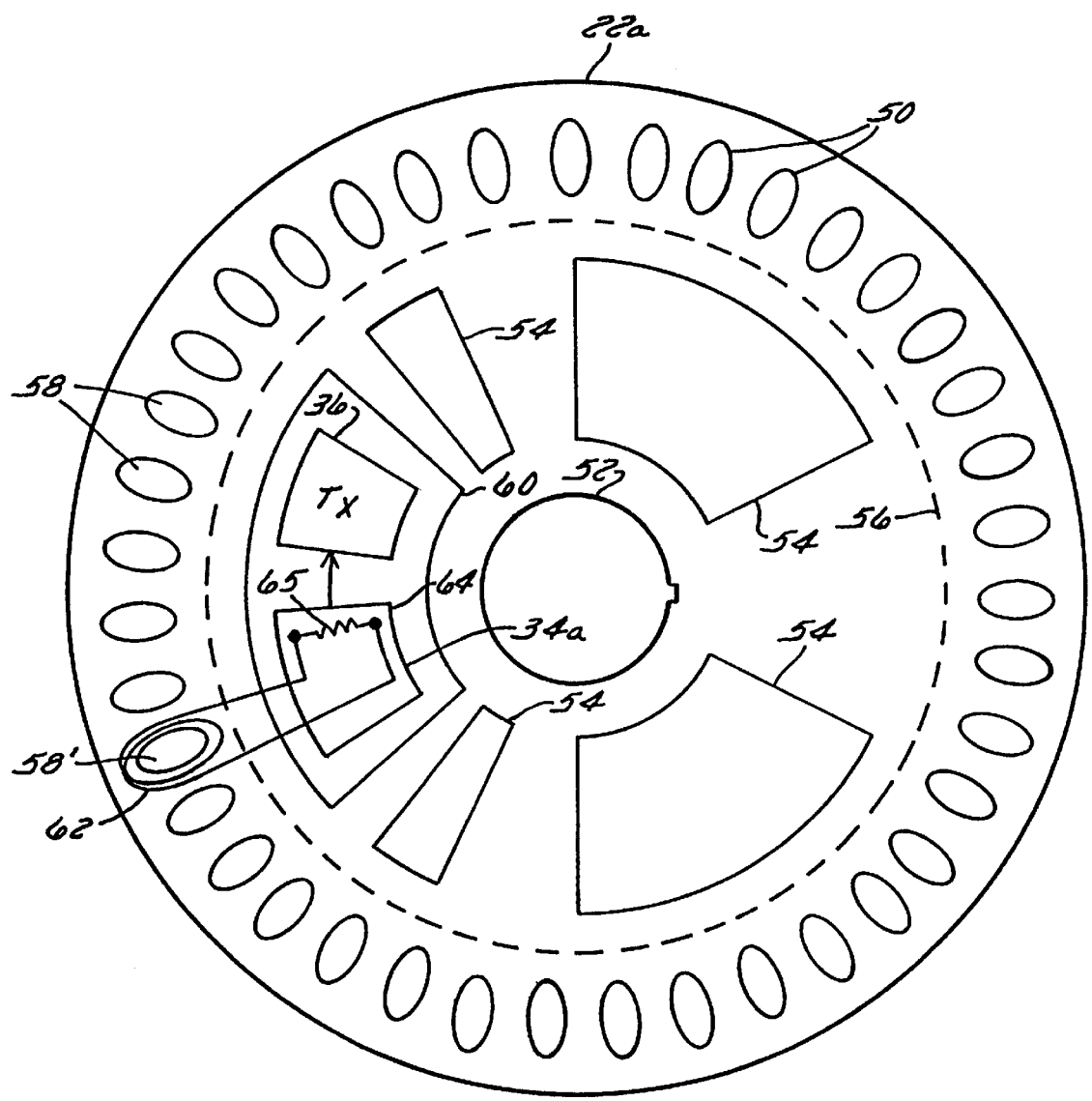
FIG. 3 is a sensor lamination having a current transformer-type current sensor embedded therein in accordance with an embodiment of the present invention.

Referring first to FIG. 3, a sensor lamination 22a is illustrated that contains a sensor 34a which measures the current through one of the rotor windings. In many respects, the sensor lamination 22a and the other laminations 20 are similarly constructed. In particular, the sensor lamination 22a is disk-shaped and has a plurality of apertures formed therein including apertures 50, 52 and 54. The apertures 50 are preferably identically shaped, are evenly spaced around the perimeter of the lamination, and are equidistant from the outside perimeter of the lamination. The total number of apertures 50 and the particular shape of the apertures 50 will vary from motor to motor. In this regard, it may also be noted that the relative sizes of all of the features shown in FIG. 3 will vary from motor to motor, since the sizes of some of the features are dependent on motor size and others are not.

During fabrication of the rotor 16, when the laminations 20 and the lamination 22a are stacked one on top of another, the apertures 50 of neighboring ones of the laminations are substantially concentrically aligned to form a plurality of slots that extend longitudinally through the rotor core 19. (In practice, a slight skew is often intentionally introduced so that the rotor slots are skewed by one slot over the length of the rotor core 19.) The laminations are then clamped together with a die that covers the region within the dashed line 56, and molten metal (e.g., aluminum) is injected into the slots formed by the apertures 50. When the molten metal cools, it forms a plurality of rotor bars 58 as well as two end rings 59 (see FIG. 1B). The rotor bars 58 extend longitudinally between the two end rings 59 and are disposed in the slots formed by the apertures in the laminations 20 and 22a. The rotor bars 58 in combination with the end rings 59 form the windings of the rotor 16.

The aperture 52 provides an opening for the shaft 18 to fit through the rotor core 19. The aperture 52 is not filled with molten metal because it is within the region 56 that is covered by the die when the molten metal is injected into the apertures 50.

The apertures 54 are for ventilation and promote heat dissipation. Again, the apertures 54 are not filled with molten metal because they are within the region 56 that is covered by the die when the molten metal is injected into the apertures 50.

Unlike the laminations 20, the sensor lamination 22*a* includes a sensor 34*a* that measures the current through a rotor bar 58' which is one of the rotor bars 58. To this end, the sensor lamination 22*a* includes an additional aperture 60 that forms a cavity in the lamination 22*a* and therefore in the stack of laminations 20 and 22*a* as a whole. The sensor 34*a* and the transmitter 36 are both contained (at least partially) within the cavity 60. The sensor 34*a* is implemented in the form of a current transformer in which the rotor bar 58' partially forms the primary winding and a multi-turn winding 62 forms the secondary winding. The remainder of the primary winding is formed by the end rings 59 and the remaining rotor winding structure, which connect the two longitudinal ends of the rotor bar 58'. Although only two turns are shown, the secondary winding 62 is in practice formed of many turns. The sensor 34*a* also comprises sensing circuitry 64 that measures a voltage developed across a burden resistor 65 to provide a measurement of the current flowing in the rotor bar 58'.

During fabrication of the rotor 16, the winding 62 is inserted to the sensor lamination 22*a* when the sensor lamination is first fabricated, and the sensing circuitry 64 and the transmitter 36 are added after the rotor windings have been fabricated. Thus, when the molten metal is injected into the slots 50, the sensing circuitry 64 and the transmitter 36 are not in the cavity 60. This prevents the extreme heat of this portion of the rotor fabrication process from destroying the sensing circuitry 64 and the transmitter 36. Since the winding 62 is formed only of wire, the winding 62 is able to withstand the extreme heat.

Once the molten metal has cooled and the rotor windings have formed, the die that covers the region 56 is removed and the cavity 60 is exposed. Since the lamination 22*a* is an end lamination, the cavity 60 is readily accessible. If it is desirable to locate the lamination 22*a* more towards the center of the stack of laminations, then the laminations 20 between the lamination 22*a* and the end of the stack should be provided with similarly located apertures to permit access to the cavity 60 from the exterior of the rotor core 19.

The lamination 22*a* is fabricated such that the leads of the secondary winding 62 are exposed within the cavity 60. Thus, once the molten metal has cooled, the leads of the secondary winding 62 may be easily connected to the sensing circuitry 64. The sensing circuitry 64 and the transmitter 36 are then permanently mounted within the cavity 60. Although the other laminations 20 preferably have a thickness on the order of about 0.025", the thickness of the lamination 22*a* may be made larger if necessary so that adequate space exists for the transmitter 36 and the sensing circuitry 64.

In operation, the current flowing in the rotor bar 58' induces a current in the secondary winding 62. The flow of current in the secondary winding 62 causes a voltage to develop across the burden resistor 65. The sensing circuitry 62 measures the voltage developed across the burden resistor 65 to obtain a measurement of the current in the rotor bar 58'. The sensing circuitry 64 provides this measurement to the transmitter 36, which then transmits the measurement to the receiver 40. The measurement is then transmitted to the motor control system 42, which utilizes the measurement to control the motor 10 in closed loop fashion. For example, the magnitude of the current may be used as an indication of torque if the motor control system 42 implements torque control. Alternatively, the frequency of the current may be used as an indication of rotor velocity if the motor control system 42 implements velocity control. In either case, it is necessary to synchronize the phase of the voltage or current that is applied to the stator windings with the angular position of the rotor 16. Therefore, the phase of the current may be used by the motor control system 42 to this end.

It may be noted that the rotor 16 could also be fabricated using pre-formed rotor bars. In particular, rather than injecting molten metal into the slots defined by the apertures 50, solid metal bars may be mechanically driven into the slots (e.g., pounded in with a hammer). The advantage of this approach is that it eliminates the need for special provision to be made that allows components to be added later, since there is no concern regarding components surviving the extreme temperature of molten metal. The disadvantage of this approach is that it is more labor intensive in practice.

Figure 4:
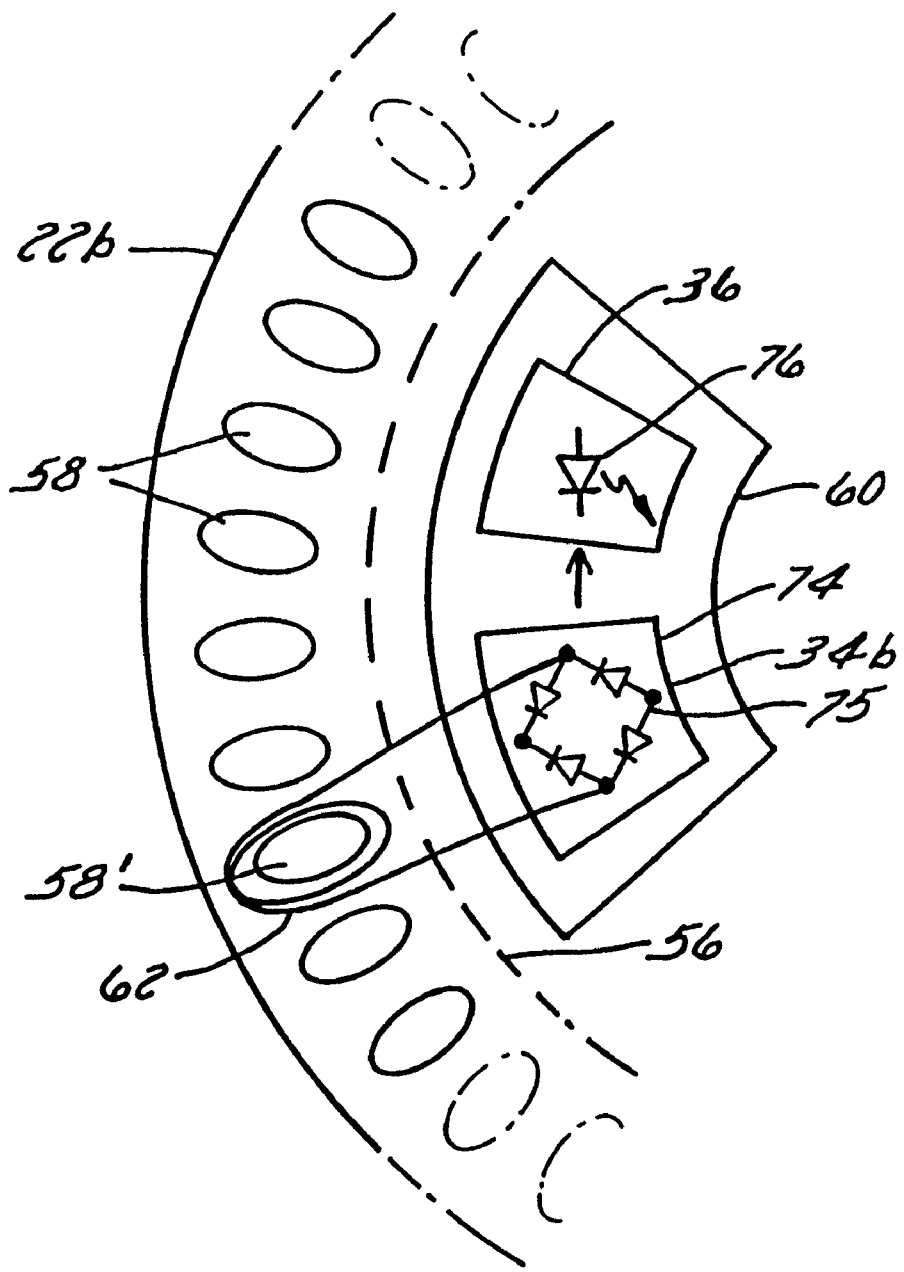
FIG. 4 is a sensor lamination having a current sensor embedded therein that detects zero-crossings of the rotor current in accordance with an embodiment of the present invention.

Referring next to FIG. 4, a sensor lamination 22*b* having a current sensor 34*b* embedded therein in accordance with an embodiment of the present invention. Only a portion of the sensor lamination 22*b* is shown since the sensor lamination 22*b* is the same as the sensor lamination 22*a* except as illustrated. In this regard, it may be noted that a rotor 16 comprising the sensor lamination 22*b* may be fabricated in the manner described above in conjunction with the sensor lamination 22*a*.

The current sensor 34*b* is used to detect the phase of the current through the rotor bar 58'. To this end, the sensor 34*b* is again implemented in the form of a current transformer in which the rotor bar 58' partially forms the primary winding and a multi-turn winding 62 forms the secondary winding. The sensor 34*b* also comprises sensing circuitry 74 that includes a rectifier 75. The transmitter 36 includes a light emitting diode (LED) 76.

In operation, the current flowing in the rotor bar 58' induces a current in the secondary winding 62. The current in the secondary winding 62 causes a voltage to develop across the rectifier 75. The output of the rectifier drives the LED 76. Accordingly, the LED 76 emits light whenever the magnitude of the voltage that is developed across the secondary winding is above zero (regardless whether the voltage is positive or negative), and does not emit light when the voltage across the secondary winding passes through zero. By using the receiver 40 to detect instances at which the LED 76 momentarily turns off, the motor control system 42 is able to detect zero-crossings of the current in the rotor bar 58' and thereby determine its phase. The phase of the current in the rotor bar 58' is then used by the motor control system 42 to synchronize the phase of the voltage or current that is applied to the stator windings with the angular position of the rotor 16. Additionally, the zero crossings could also be used to determine the frequency of the current in the rotor bar 58', and thereby to determine the velocity of the rotor shaft 18.

In practice, the turn-on voltage of the LED 76 ensures that the LED 76 does not turn on immediately after passing through zero, and thus remains off for a sufficient period of time to be detected by the motor control system 42. If desired, more complicated circuitry could be utilized to detect when the current through the rotor bar 58' passes through a predetermined level that is different than zero.

As compared to the sensor 34a shown in FIG. 3, the sensor 34b shown in FIG. 4 only provides information pertaining to the phase and frequency of the rotor current, and not its magnitude. However, the sensor 34b is less complex. Likewise, the transmitter 36 also is less complex and requires less power because less information is communicated across the rotor airgap.

Figure 5:
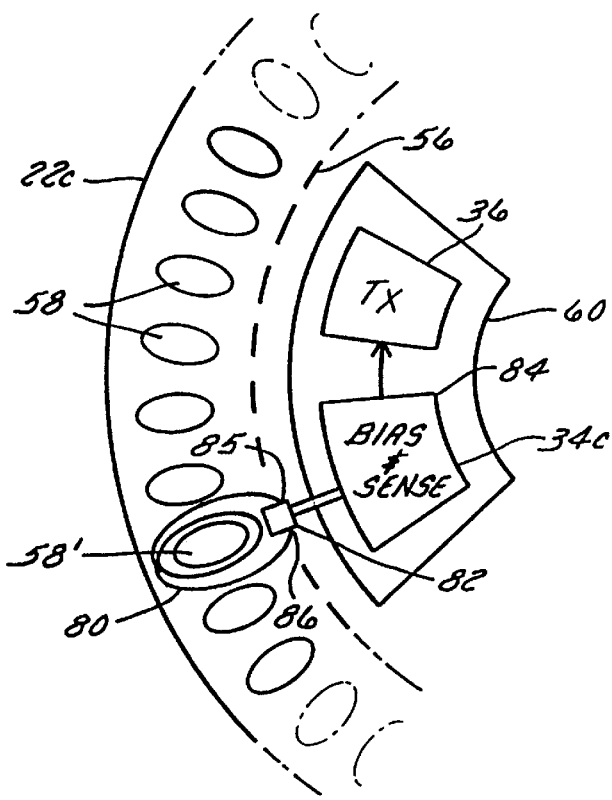
FIG. 5 is a sensor lamination having a Hall effect-type current sensor embedded therein in accordance with an embodiment of the present invention.

Referring next to FIG. 5, a portion of a sensor lamination 22c is illustrated which contains a sensor 34c. The sensor 34c is a current sensor used to measure current through one of the rotor bars 58', and comprises a magnetic core 80, a Hall effect device 82, and a biasing and sensing circuit 84. The magnetic core 80 substantially encircles the rotor bar 58'. The magnetic core 80 does not entirely encircle the rotor bar 58' because the Hall effect device 82 is interposed between first and second adjacent ends 85 and 86 of the magnetic core 80.

In operation, the biasing and sensing circuit 84 biases the Hall effect device 80. The Hall effect device 80 is operative to detect magnetic flux produced by the current flowing through the rotor bar 58' and thereby to obtain a measurement of the current flowing through the rotor bar 58'. The biasing and sensing circuit 84 senses the output of the Hall effect device 80 and communicates with the transmitter 36 to enable the transmitter 36 to transmit a current measurement to the receiver 40.

The current measurement obtained by the current sensor 34c may be used in the same manner as described above in conjunction with the current sensor 34a. The advantage of the current sensor 34c is that it is able to measure currents having a frequency that approaches zero (i.e., direct current). Thus, the current sensor 34c may be used at very low speeds when the slip frequency is of particular interest.

Figure 6:
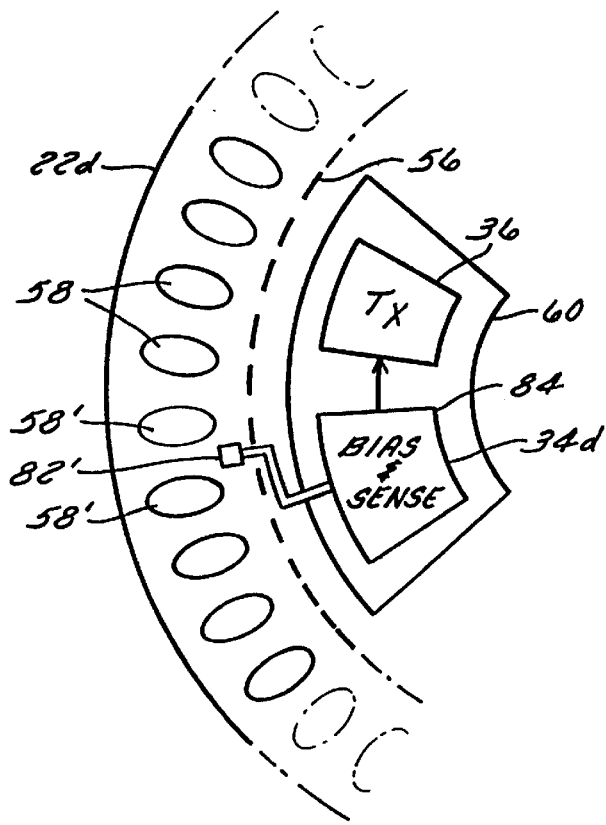
FIG. 6 is sensor lamination having a Hall effect sensor embedded therein that measures rotor flux in accordance with an embodiment of the present invention.

Referring next to FIG. 6, a sensor lamination 22d is illustrated which contains a sensor 34d used to measure magnetic flux flowing in the rotor 16. The construction and operation of the sensor 34d is generally similar to the construction and operation of the sensor 34c. Unlike the sensor 34c, however, the sensor 34d does not utilize a magnetic core. Additionally, the sensor 34d comprises a Hall effect device 82' that is disposed generally in between two rotor bars 58'.

In operation, the Hall effect device 82' senses magnetic flux that flows between the two rotor bars 58' and that is perpendicularly oriented relative to the longitudinal orientation of the rotor bars 58'. The information obtained by the sensor 34d may be used by the motor control system 42 to synchronize the phase of the voltage or current that is applied to the stator windings with the angular position of the rotor 16.

Figure 7:
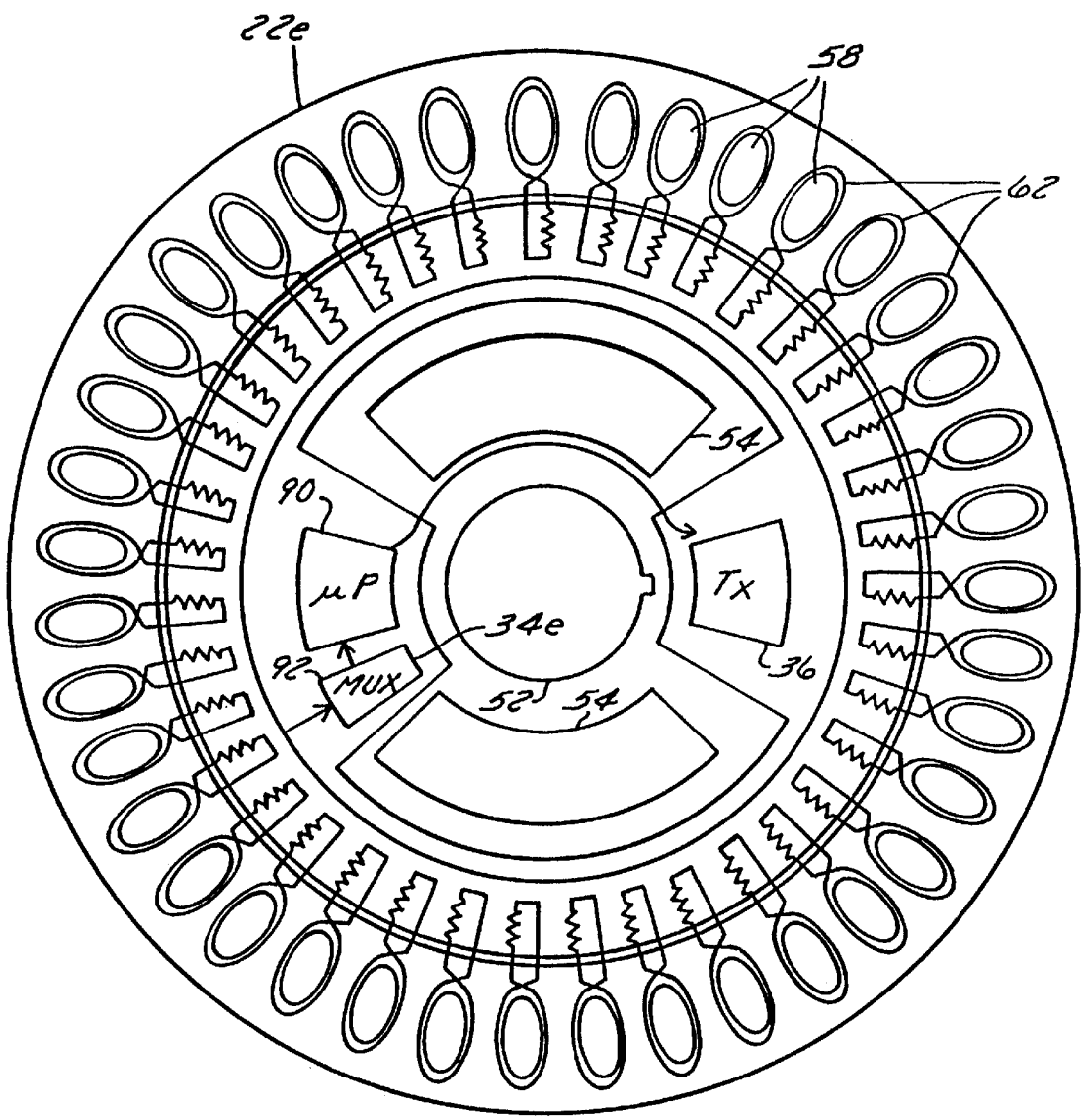
FIG. 7 is a sensor lamination having a sensor embedded therein that is formed of multiple current transformers each of which is associated with a respective rotor bar to detect rotor bar fatigue in accordance with an embodiment of the present invention.

Referring next to FIG. 7, a sensor lamination 22e is illustrated which contains a sensor 34e that is used to sense rotor bar fatigue (e.g., broken rotor bars). The sensor 34e comprises a plurality of current transformers each of which comprises a secondary windings 62 wound around a respective one of the rotor bars 58. The secondary windings 62 are each terminated at a burden resistor, so that the current flowing in the rotor bar may be measured in the manner previously described in conjunction with FIG. 3. The sensor 34e also comprises a processor circuit 90 and a multiplexer 92 used by the processor circuit 90 to sequentially test the rotor bars 58 one at a time. There is no need to examine the rotor bars 58 all at once since rotor bar fatigue is not a rapidly changing condition.

In operation, the processor circuit 90 compares the current flowing through each of the rotor bars 58 with the current flowing through the remaining rotor bars 58. If the current flowing through one of the rotor bars 58 is markedly different than the current flowing through the remaining rotor bars 58, then this indicates a failing rotor bar. Of course, if no current is flowing through one of the rotor bars 58, then this indicates that the particular rotor bar is broken. The transmitter 36 then communicates whether and how many rotor bars are failing or broken to the receiver 40. Alternatively, the transmitter 36 could transmit current measurements from each of the secondary windings 62 to the motor control system 42, and the motor control system 42 could then perform the comparisons of the current measurements.

The sensor 34e facilitates predictive maintenance of the motor 10. The motor control system 42 knows how many rotor bars are failing or broken and, on this basis, a prediction can be made of the remaining useful life of the motor 10. The motor 10 may therefore be replaced during off hours in advance of failure, rather than during the middle of a production run, for example.

In addition to being used to measure the current in the rotor windings, the present invention could also be used in a number of other ways. For example, a sensor lamination may be constructed that contains a sensor that monitors the temperature of the rotor 16. In such an arrangement, the sensor 34 may be provided in the form of one or more resistive temperature devices (RTDs), which have a resistance that varies according to sensed temperature. If multiple RTDs are used, a multiplexer can select between the RTDs so that the transmitter 36 transmits temperature information from a selected one of the RTDs to the receiver 40. The temperature information may then be used by the motor control system 42 to detect when the rotor 16 (and therefore the motor 10) is overloaded, for example.

In another embodiment, a sensor lamination could be provided that contains a sensor that measures rotor air gap. In such an arrangement, the sensor lamination may comprise a proximity sensor disposed at an outer periphery of the sensor lamination. By monitoring the distance between the location on the rotor at which the proximity sensor is placed and the inner periphery of the stator, variations in the distance between the inner periphery of the stator 12 and the outer periphery of the rotor 16 may be detected. Such variations may be caused, for example, by stator eccentricity.

In still yet another embodiment, a sensor lamination may be constructed that measures rotor torque. In such an arrangement, the sensor lamination may have a section that is formed of piezoelectric material and that extends from the center of the lamination to the outer periphery. In operation, torsion of the sensor lamination would place pressure on either side of the piezoelectric material, causing the piezoelectric material to produce a voltage indicative of motor torque.

It is therefore seen that the present invention advantageously provides a way of sensing rotor-associated conditions. These conditions include conditions that relate to the general state of the rotor (e.g., whether one or more rotor bars is broken or otherwise overly fatigued, whether the rotor and therefore the motor is overloaded, and so on). These conditions also include conditions that are parameters which can be measured and assigned a value (e.g., the magnitude, frequency and phase of the current flowing in one of the rotor bars). Although numerous embodiments have already been described that are capable of sensing various different conditions, it will appreciated that numerous other embodiments are also possible.

It should also be noted that the different embodiments of the inventions are not mutually exclusive. For example, a sensor lamination could be provided that includes one or more of the embodiments of the invention described above. Also, the present invention can be used in conjunction with any electromechanical device having a rotor that is capable of rotating relative to a stator. For example, the present invention may also be used in conjunction with electric generators.

Many other changes and modifications may be made to the present invention without departing from the spirit thereof. The scope of these and other changes will become apparent from the appended claims.

We claim:

1. A rotor having a longitudinal axis, the rotor comprising:
    a shaft disposed along the longitudinal axis; and
    a rotor core disposed along the longitudinal axis comprising:
        a plurality of laminations disposed generally transverse to the longitudinal axis, one or more of the plurality of laminations being a sensor lamination comprising:
            at least one cavity;
            at least one embedded sensor at least partially disposed within the cavity; and
            at least one transmitter at least partially disposed within the cavity.

2. The rotor according to claim 1, where the transmitter transmits by optical means.

3. The rotor according to claim 2, where the transmitter is a light emitting diode.

4. The rotor according to claim 1, where the transmitter communicates over radio frequencies.

5. The rotor according to claim 1, where the plurality of laminations are disk shaped.

6. The rotor according to claim 1, where the plurality of laminations contain a plurality of apertures.

7. The rotor according to claim 6, where the plurality of apertures are identically shaped.

8. The rotor according to claim 7, where the plurality of apertures are evenly spaced around a perimeter of the plurality of laminations.

9. The rotor according to claim 8, where the plurality of apertures are equidistant from the perimeter of the plurality of laminations.

10. The rotor according to claim 9, where a plurality of rotor bars are generally disposed parallel to the longitudinal axis through the plurality of apertures.

11. The rotor according to claim 1, where the embedded sensor comprises an apparatus for measuring a current.

12. The rotor according to claim 1, where the embedded sensor comprises an apparatus for measuring a torque.

13. The rotor according to claim 1, where the embedded sensor comprises an apparatus for measuring a velocity.

14. The rotor according to claim 1, where the embedded sensor comprises an apparatus for measuring a temperature.

15. The rotor according to claim 1, where the embedded sensor comprises an apparatus for measuring an air gap.

16. The rotor according to claim 1, where the embedded sensor comprises an apparatus for measuring a voltage.

17. The rotor according to claim 1, further comprising a control system.

18. The rotor according to claim 17, where the control system is a closed loop feedback system.

19. The rotor according to claim 17, where the control system is an open loop system.

20. An electromechanical device having a longitudinal axis, the electromechanical device comprising:
    a stator;
    a receiver;
    a rotor disposed along the longitudinal axis, the rotor comprising:
        a shaft;
        a rotor core comprising:
            a plurality of laminations disposed generally transverse to the longitudinal axis, one or more of the laminations being a sensor lamination comprising:
                at least one cavity;
                at least one embedded sensor at least partially disposed within the cavity; and
                at least one transmitter at least partially disposed within the cavity for transmitting signals to the receiver.

21. The electromechanical device according to claim 20, where the receiver is disposed upon the stator.

22. The electromechanical device according to claim 20, where the transmitter and the receiver communicate optically.

23. The electromechanical device according to claim 22, where the transmitter is a light emitting diode.

24. The electromechanical device according to claim 22, where the receiver is an array of photodetectors.

25. The electromechanical device according to claim 20, where the transmitter and the receiver communicate over radio frequencies.

26. The electromechanical device according to claim 20, where the plurality of laminations are disk shaped.

27. The electromechanical device according to claim 20, where the plurality of laminations contain a plurality of apertures.

28. The electromechanical device according to claim 27, where the plurality of apertures are identically shaped.

29. The electromechanical device according to claim 28, where the plurality of apertures are evenly spaced around a perimeter of the plurality of laminations.

30. The electromechanical device according to claim 29, where the plurality of apertures are equidistant from the perimeter of the plurality of laminations.

31. The electromechanical device according to claim 30, where a plurality of rotor bars are generally disposed along the longitudinal axis through the plurality of apertures.

32. The electromechanical device according to claim 20, where the embedded sensor comprises an apparatus for measuring a current.

33. The electromechanical device according to claim 20, where the embedded sensor comprises an apparatus for measuring a torque.

34. The electromechanical device according to claim 20, where the embedded sensor comprises an apparatus for measuring a velocity.

35. The electromechanical device according to claim 20, where the embedded sensor comprises an apparatus for measuring a temperature.

36. The electromechanical device according to claim 20, where the embedded sensor comprises an apparatus for measuring an air gap.

37. The electromechanical device according to claim 20, where the embedded sensor comprises an apparatus for measuring a voltage.

38. The electromechanical device according to claim 20, further comprising a control system.

39. The electromechanical device according to claim 38, where the control system is a closed loop feedback system.

40. The electromechanical device according to claim 38, where the control system is an open loop system.

41. The electromechanical device according to claim 20, where the electromechanical device is an electric motor.

42. The electromechanical device according to claim 41, where the electric motor is an induction motor.

43. The electromechanical device according to claim 20, where the electromechanical device is an electric generator.

44. An electric motor having a longitudinal axis, said electric motor comprising:
- a motor control system;
- a stator comprising a receiver; and
- a rotor disposed along the longitudinal axis, said rotor comprising:
  - a shaft;
  - a rotor core comprising:
    - a plurality of disk shaped laminations disposed generally transverse to the longitudinal axis, one or more of the laminations being a sensor lamination comprising:
      - at least one cavity;
      - at least one embedded sensor at least partially disposed within the cavity; and
      - at least one transmitter at least partially disposed within the cavity; and
    - a plurality of apertures contained within the plurality of disk shaped laminations; and
  - a plurality of rotor bars generally disposed along the longitudinal axis through the plurality of apertures.

45. The electric motor according to claim 44, where the transmitter and the receiver communicate optically.

46. The electric motor according to claim 45, where the transmitter is a light emitting diode.

47. The electric motor according to claim 45, where the receiver is an array of photodetectors.

48. The electric motor according to claim 44, where the transmitter and the receiver communicate over radio frequencies.

49. The electric motor according to claim 44, where the plurality of apertures are identically shaped.

50. The electric motor according to claim 49, where the plurality of apertures are evenly spaced around a perimeter of the plurality of disk shaped laminations.

51. The electric motor according to claim 50, where the plurality of apertures are equidistant from the perimeter of the plurality of laminations.

52. The electric motor according to claim 44, where the embedded sensor comprises an apparatus for measuring a current.

53. The electric motor according to claim 44, where the embedded sensor comprises an apparatus for measuring a torque.

54. The electric motor according to claim 44, where the embedded sensor comprises an apparatus for measuring a velocity.

55. The electric motor according to claim 44, where the embedded sensor comprises an apparatus for measuring a temperature.

56. The electric motor according to claim 44, where the embedded sensor comprises an apparatus for measuring an air gap.

57. The electric motor according to claim 44, where the embedded sensor comprises an apparatus for measuring a voltage.

58. The electric motor according to claim 44, where the motor control system is a closed loop feedback system.

59. The electric motor according to claim 44, where the motor control system is an open loop system.

* * * * *